ns009756073B2

United States Patent
Bendersky et al.

(10) Patent No.: US 9,756,073 B2
(45) Date of Patent: *Sep. 5, 2017

(54) IDENTIFYING PHISHING COMMUNICATIONS USING TEMPLATES

(71) Applicant: Google Inc., Mountain View, CA (US)

(72) Inventors: Mike Bendersky, Sunnyvale, CA (US); Luis Garcia Pueyo, San Jose, CA (US); Kashyap Ramesh Puranik, Mountain View, CA (US); Amitabh Saikia, Mountain View, CA (US); Jie Yang, Sunnyvale, CA (US); Marc-Allen Cartright, Stanford, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/416,632

(22) Filed: Jan. 26, 2017

(65) Prior Publication Data

US 2017/0149824 A1     May 25, 2017

Related U.S. Application Data

(63) Continuation of application No. 14/711,407, filed on May 13, 2015, now Pat. No. 9,596,265.

(51) Int. Cl.
    *G06F 21/50*     (2013.01)
    *H04L 29/06*     (2006.01)

(52) U.S. Cl.
    CPC ...... *H04L 63/1483* (2013.01); *H04L 63/0254* (2013.01); *H04L 63/1425* (2013.01)

(58) Field of Classification Search
    CPC ............................ H04L 63/30; H04L 63/1483
    USPC ..................................................... 726/22–25
    See application file for complete search history.

(56) References Cited

U.S. PATENT DOCUMENTS

| 8,220,047 B1 * | 7/2012 | Soghoian ............... H04L 51/14 709/206 |
| 8,566,938 B1 | 10/2013 | Prakash et al. |
| 8,719,940 B1 | 5/2014 | Higbee et al. |

(Continued)

OTHER PUBLICATIONS

Sanchez, F., & Duan, Z. (Dec. 2012). A sender-centric approach to detecting phishing emails. In Cyber Security (CyberSecurity), 2012 International Conference on (pp. 32-39). IEEE.

(Continued)

*Primary Examiner* — Haresh N Patel
(74) *Attorney, Agent, or Firm* — Middleton Reutlinger

(57) ABSTRACT

Methods, apparatus, systems, and computer-readable media are provided for determining whether communications are attempts at phishing. In various implementations, a potentially-deceptive communication may be matched to one or more templates of a plurality of templates. Each template may represent content shared among a cluster of communications sent by a legitimate entity. In various implementations, it may be determined that an address associated with the communication is not affiliated with one or more legitimate entities associated with the one or more matched templates. In various implementations, the communication may be classified as a phishing attempt based on the determining.

20 Claims, 6 Drawing Sheets

(56) References Cited

U.S. PATENT DOCUMENTS

| | | | |
|---|---|---|---|
| 2003/0069880 A1* | 4/2003 | Harrison | G06F 17/30663 713/170 |
| 2007/0094500 A1 | 4/2007 | Shannon et al. | |
| 2008/0046738 A1 | 2/2008 | Galloway et al. | |
| 2008/0289047 A1 | 11/2008 | Benea et al. | |
| 2009/0044013 A1* | 2/2009 | Zhu | G06Q 10/107 713/170 |
| 2012/0215853 A1 | 8/2012 | Sundaram et al. | |
| 2012/0240236 A1 | 9/2012 | Wyatt et al. | |
| 2012/0254333 A1 | 10/2012 | Chandramouli et al. | |
| 2012/0271827 A1* | 10/2012 | Merz | G06F 17/3069 707/737 |
| 2013/0086677 A1* | 4/2013 | Ma | G06F 17/3089 726/22 |
| 2013/0097700 A1* | 4/2013 | Chen | H04L 63/1483 726/22 |
| 2013/0114105 A1* | 5/2013 | Liu | G06F 17/3089 358/1.15 |
| 2013/0185327 A1* | 7/2013 | Biesenbach | G06F 17/30675 707/769 |
| 2013/0238721 A1* | 9/2013 | Patel | G06Q 10/107 709/206 |
| 2014/0074948 A1* | 3/2014 | Farkas | H04L 51/12 709/206 |
| 2014/0230061 A1* | 8/2014 | Higbee | H04L 63/1416 726/24 |
| 2015/0067833 A1* | 3/2015 | Verma | H04L 63/1483 726/22 |
| 2015/0229664 A1* | 8/2015 | Hawthorn | H04L 63/1408 726/25 |
| 2016/0034469 A1 | 2/2016 | Livingston et al. | |
| 2016/0050164 A1* | 2/2016 | Crisman | G06Q 30/00 709/206 |
| 2016/0142439 A1* | 5/2016 | Goutal | H04L 63/1483 726/22 |
| 2016/0337401 A1* | 11/2016 | Bendersky | H04L 63/1483 726/22 |

OTHER PUBLICATIONS

Moura, Giovane CM, and Aiko Pras. "Scalable Detection and Isolation of Phishing." Scalability of Networks and Services. Springer Berlin Heidelberg, 2009. 195-198.

Fette, I., Sadeh, N., & Tomasic, A. (May 2007). Learning to Detect Phishing Emails. In Proceedings of the 16th International conference on World Wide Web (pp. 649-656). ACM.

Chandrasekaran, M., Narayanan, K., & Upadhyaya, S. (Jun. 2006) Phishing email detection based on structural properties. In NYS Cyber Security Conference (pp. 1-7).

Soman, Chinmay, et al. "An Intelligent System for Phish Detection, Using Dynamic Analysis and Template Matching." World Academy of Science, Engineering and Technology 42 (2008): 321-327.

International Search Report and Written Opinion of PCT Serial No. PCT/US16/032175 Jul. 20, 2016; 10 pages.

* cited by examiner

IDENTIFYING PHISHING COMMUNICATIONS USING TEMPLATES

BACKGROUND

"Phishing" refers to an attempt to obtain sensitive and/or personal information from a user by masquerading as a legitimate entity. For example, a deceptive entity may generate an email that closely resembles a legitimate email sent by a financial institution, and may send this email to financial institute customers. The email may, for instance, request that recipients click on a legitimate-appearing link that in fact leads to an illegitimate webpage (i.e., not affiliated with the financial institution). The illegitimate webpage, which also may mimic a legitimate financial institution webpage in appearance, may request personal information such as the customer's username, password, social security number, etc. In this manner, the deceptive entity "phishes" for personal information. Various techniques exist to attempt to identify phishing emails. However, give the ubiquity of emails (over one hundred billion sent and received daily worldwide), analyzing entire email contents to identify phishing attempts has proven difficult.

SUMMARY

The present disclosure is generally directed to methods, apparatus, and computer-readable media (transitory and non-transitory) for determining whether communications such as emails are legitimate or phishing attempts. In various implementations, legitimate communications sent by legitimate (also referred to herein as "trustworthy") entities, and in particular, business-to-consumer ("B2C") communications typically mimicked by phishers, may be grouped by shared content into clusters. A so-called "template," which may be a reduced-dimensionality feature set that represents content shared among communications of a cluster sent by a legitimate entity, may be generated for each cluster. A plurality of generated templates may be indexed on various features, some of which may be phrases extracted from the templates. A potentially-deceptive communication may be matched to one or more templates associated with the one or more clusters based on various measures of similarity between the communication and the templates. In particular, various features of the potentially-deceptive communication may be compared to indexed features of the plurality of templates. Assuming at least one template has content that sufficiently matches the potentially-deceptive communication, an address associated with the communication (e.g., a sender email address, a reply-to email address, a URL linked to by the email, a URL contained in a linked-to landing page, etc.) may be compared one or more addresses (or patterns of addresses) known to be affiliated with a trustworthy entity associated with the matching template. If there is a match, the communication is likely legitimate. If not, however, then the communication is likely a phishing attempt, and may be so-classified and/or discarded.

Classifying communications as phishing attempts provides various technical advantages. For example, if such classification occurs prior to the communication being presented to the intended recipient, it is possible to discard the communication without the recipient ever seeing it, minimizing distraction, reducing inbox clutter, and easing strain on computing resources used by the recipient. As another example, the farther upstream from the intended recipient such classification occurs (e.g., closer in network hops to the source), the earlier the phishing communication can be discarded without being passed along (and wasting computing resources of) various intermediate network components. Aggregate upstream classification and discarding of deceptive communications may reduce network traffic significantly, which in turn may free network resources (e.g., bandwidth) for legitimate purposes, potentially improving operation of all networked computing systems.

Comparing selected features of potentially-deceptive communications to features of templates, particularly where those template features are indexed, also provides various technical advantages over existing techniques for identifying phishing attempts. For example, and as mentioned in the background, analyzing entire email contents to identify phishing attempts may be impracticable because of the sheer volume of emails exchanged daily. However, by creating templates to represent content shared among clusters of legitimate emails, and by indexing those templates on multiple features (particularly by one or more phrases contained in the templates), it is possible to rapidly match high volumes of potentially-deceptive communications to templates while using less computing resources than would be required to analyze entire contents of communications. Such efficient indexing and comparison techniques may enable more potentially-deceptive communications to be classified as phishing attempts. As noted above, discarding phishing communications, particularly well upstream of the recipient, may reduce network congestion and free up networking and computing resources for other purposes.

In some implementations, a computer implemented method may be provided that includes: performing, by one or more processors, a first comparison between content of a communication to content of a plurality of templates, wherein each template represents content shared among a cluster of communications sent by a known legitimate entity; identifying, by one or more of the processors based on the first comparison, one or more matching templates from the plurality of templates, wherein the one or more matching templates are associated with one or more known legitimate entities; performing, by one or more of the processors, a second comparison of an address associated with the communication with one or more respective address patterns associated with the one or more known legitimate entities; determining, by one or more of the processors based on the second comparison, that the address associated with the communication does not match the one or more respective address patterns; classifying, by one or more of the processors based on the determining, the communication as a phishing attempt; and discarding or re-routing, by one or more of the processors, the communication based on the classifying.

In various implementations, the determining may include, for each of the one or more legitimate entities associated with the one or more matching templates, comparing: a combination of the address associated with the communication and a subject of the communication; to a combination of a pattern of addresses associated with the legitimate entity and a pattern found among subjects of communications sent by the legitimate entity.

In various implementations, performing the first comparison may include determining respective measures of similarity of the plurality of templates to the communication. In various implementations, the method may further include: ranking the plurality of templates based on their respective measures of similarity; and selecting, as the one or more matching templates, a predetermined number of highest ranking templates.

In various implementations, the address may be a linked-to network address contained in the communication, a sender address, and/or a reply-to address. In various implementations, the first comparison may include comparing one or more n-grams in the communication to one or more n-grams used to index the plurality of templates. In various implementations, the one or more n-grams used to index the plurality of templates may be extracted from the content of the plurality of templates. In various implementations, the first comparison may include comparing one or more overlapping n-grams in the communication to one or more overlapping n-grams used to index the plurality of templates.

In another aspect, a computer-implemented method may include: matching, by one or more processors, a communication to a first subset of a plurality of templates using a forward index, wherein each template of the plurality of templates represents content shared among a cluster of communications sent by a known legitimate entity, and wherein the forward index is indexed on metadata associated with the plurality of templates; matching, by one or more of the processors, the communication to a second subset of the plurality of templates using a reverse index, wherein the reverse index is indexed on content of the plurality of templates; determining, by one or more of the processors, that there is no intersection between the first subset and the second subset; classifying, by one or more of the processors based on the determining, the communication as a phishing attempt; and discarding or re-routing, by one or more of the processors, the communication based on the classifying.

In yet another aspect, a computer-implemented method may include: grouping, by one or more processors, a corpus of communications sent by a plurality of known legitimate entities into a plurality of clusters based at least in part on metadata associated with the corpus of communications, wherein each cluster includes communications sent by a known legitimate entity; generating, by one or more of the processors based on the plurality of clusters, a plurality of templates, wherein each template of the plurality of templates represents content shared among a cluster of the plurality of clusters that includes communications sent by a known legitimate entity; creating, by one or more of the processors, a forward index that is indexed on metadata associated with the plurality of templates; creating, by one or more of the processors, a reverse index, wherein the reverse index is indexed on content of the plurality of templates; and discarding or re-rerouting subsequent communications that match one or more templates in one of the forward or reverse indices, but not the other.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
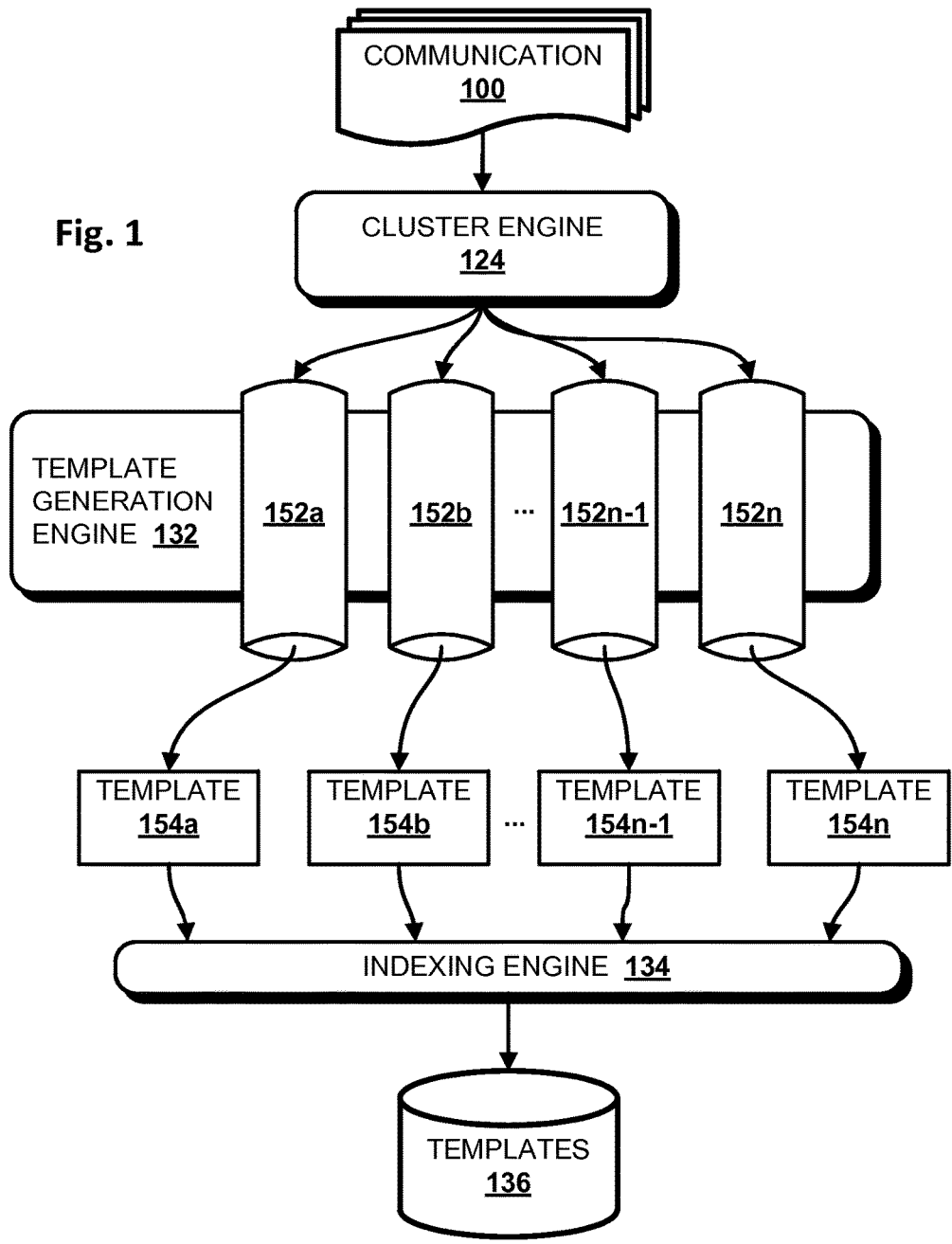
FIG. 1 illustrates an environment in which a corpus of documents (e.g., emails) may be clustered, and in which templates may be generated and indexed for each cluster, in accordance with various implementations.

FIG. 1 illustrates an example environment in which a corpus of communications 100 may be grouped into clusters 152a-n, and in which templates 154a-n may be generated for each cluster 152 and indexed, in accordance with various implementations. While the processes are depicted in a particular order, this is not meant to be limiting. One or more processes may be performed in different orders without affecting how the overall methodology operates. Engines described herein may be implemented using any combination of hardware and software. In various implementations, operations performed by a cluster engine 124, a template generation engine 132, an indexing engine 134, and/or other engines or modules described herein may be performed on individual computer systems, distributed across multiple computer systems, or any combination of the two. These one or more computer systems may be in communication with each other and other computer systems over one or more networks (not depicted).

As used herein, a "communication" may refer to an email, a text message (e.g., SMS, MMS), an instant message, a transcribed voicemail, or any other textual communication, particularly those that are automatically generated (e.g., B2C emails, invoices, reports, receipts, etc.). In various implementations, a communication 100 may include various metadata. For instance, an email may include one or more sender identifiers (e.g., sender email addresses), one or more recipient identifiers (e.g., recipient email addresses, including cc'd and bcc'd recipients), a "reply-to" address (which may be a default address to which reply emails are directed), a date sent, one or more attachments, a subject, and so forth. Emails and other electronic communications may also include one or more addresses, such as the aforementioned sender/recipient (including cc and bcc)/reply-to addresses, as well as one or more universal resource locators ("URLs") linked to by the email.

A corpus of communications 100 may be grouped into clusters 152a-n by cluster engine 124. In some implementations, cluster engine 124 may be configured to group the corpus of communications 100 into a plurality of clusters 152a-n based on one or more attributes shared among content of one or more communications 100 within the corpus. In some implementations, the plurality of clusters 152*a-n* may be disjoint, such that documents are not shared among them. In some implementations, cluster engine 124 may have one or more preliminary filtering mechanisms to discard communications that are not suitable for template generation. For example, if a corpus of communications 100 under analysis includes personal emails and B2C emails, personal emails (which may be less likely targets for phishers) may be discarded.

Cluster engine 124 may be configured to group communications 100 into clusters 152*a-n* using various techniques. In some implementations, communications such as emails may be clustered, e.g., by cluster engine 124, based on a <sender, subject> tuple. For example, a pattern such as a regular expression may be developed that matches email senders and non-personalized portions of email subjects. Emails (e.g., of a corpus) that match such patterns may be grouped into a cluster 152 of emails. In some implementations, cluster engine 124 may be configured to group communications into clusters 152 based on underlying structural similarities. For example, a set of xPaths for an email (e.g., a set of addresses to reach each node in the email's HTML node tree) may be independent of the email's textual content. Thus, the similarity between two or more such emails may be determined based on a number of shared xPaths. An email may be assigned to a particular cluster based on the email sharing a higher number of xPaths with emails of that cluster than with emails of any other cluster. Additionally or alternatively, two emails may be clustered together based on the number of xPaths they share compared to, for instance, a total number of xPaths in both emails.

In some implementations, communications 100 may additionally or alternatively be grouped into clusters 152 based on textual similarities. For example, emails may be analyzed to determine shared terms, n-grams, n-grams plus frequencies, and so forth. For example, emails sharing a particular number of shared phrases (e.g., n-grams) may be clustered together. In some implementations, communications 100 may additionally or alternatively be grouped into clusters based on byte similarity. For instance, emails may be viewed as strings of bytes that may include one or both of structure (e.g., metadata, xPaths) and textual content. In some implementations, a weighted combination of two or more of the above-described techniques may be used as well. For example, both structural and textual similarity may be considered, with a heavier emphasis on one or the other.

Once a corpus of communications 100 are grouped into clusters 152*a-n*, template generation engine 132 may be configured to generate templates 154*a-n* for the plurality of clusters 152*a-n*. A "template" 154 may refer to a variety of reduced-dimensionality feature sets that represent content shared among communications 100 of a cluster 152. For example, a template T may be defined as a set of communications $C^T = \{C_1, \ldots C_n\}$ that match a so-called "template identifier." In some implementations, a template identifier may be a <sender-regexp, subject-regexp> tuple used to group documents into a particular cluster, as described above. The set of communications $C^T$ in the cluster 152 may be tokenized into a set of unique terms per template, which may, for instance, correspond to a bag of words. Given a template term x, the "support" $S_x$ for that term may be defined as a number of communications in $C^T$ that contain the term, or formally:

$$S_x^T = |\{C | C \in C^T \wedge x \in C\}| \quad (1)$$

"Fixed text" for a template, or $F^T$, may be defined as a set of terms for which the support $S_x$ is greater than some fraction of a number of communications associated with the template, or formally:

$$F^T = \left\{ x \,\middle|\, \frac{S_x^T}{|C^T|} \geq \tau \right\} \quad (2)$$

where $0 < \tau < 1$ may be set to a particular value selected to cause transient (e.g., personal) information to be removed from the resulting template fixed text representation. The fixed text $F^T$ may then be used in some implementations to represent the template.

Additionally or alternatively, in some implementations, templates may be generated as topic-based representations. Various topic modeling techniques may be applied to documents in a cluster to generate a set of topics. For example, in some implementations, Latent Dirichlet Allocation topic modeling may be applied to fixed text of a template (e.g., the fixed text represented by equation (2) to generate a list of topics. In some instances, weights may be determined and associated with those topics.

In various implementations, indexing engine 134 may be configured to index templates 154*a-n*, e.g., in one or more template databases 136, by one or more features such as the <sender-regexp, subject-regexp> tuple mentioned above, one or more "phrases" (e.g., n-grams) extracted from each template 154, characters, groups of overlapping phrases (i.e. shingling), and so forth. In some implementations, indexing engine 134 may effectively create a "forward index" that indexes templates on one or more addresses affiliated with trustworthy entities associated with the respective templates, and a "reverse index" that indexes templates on one or more phrases contained in the templates (e.g., as features). The reverse index in particular facilitates rapid matching of potentially-deceptive communications to templates, which is advantageous given the extremely high volumes of potentially-deceptive communications, especially emails, exchanged daily.

Figure 2:
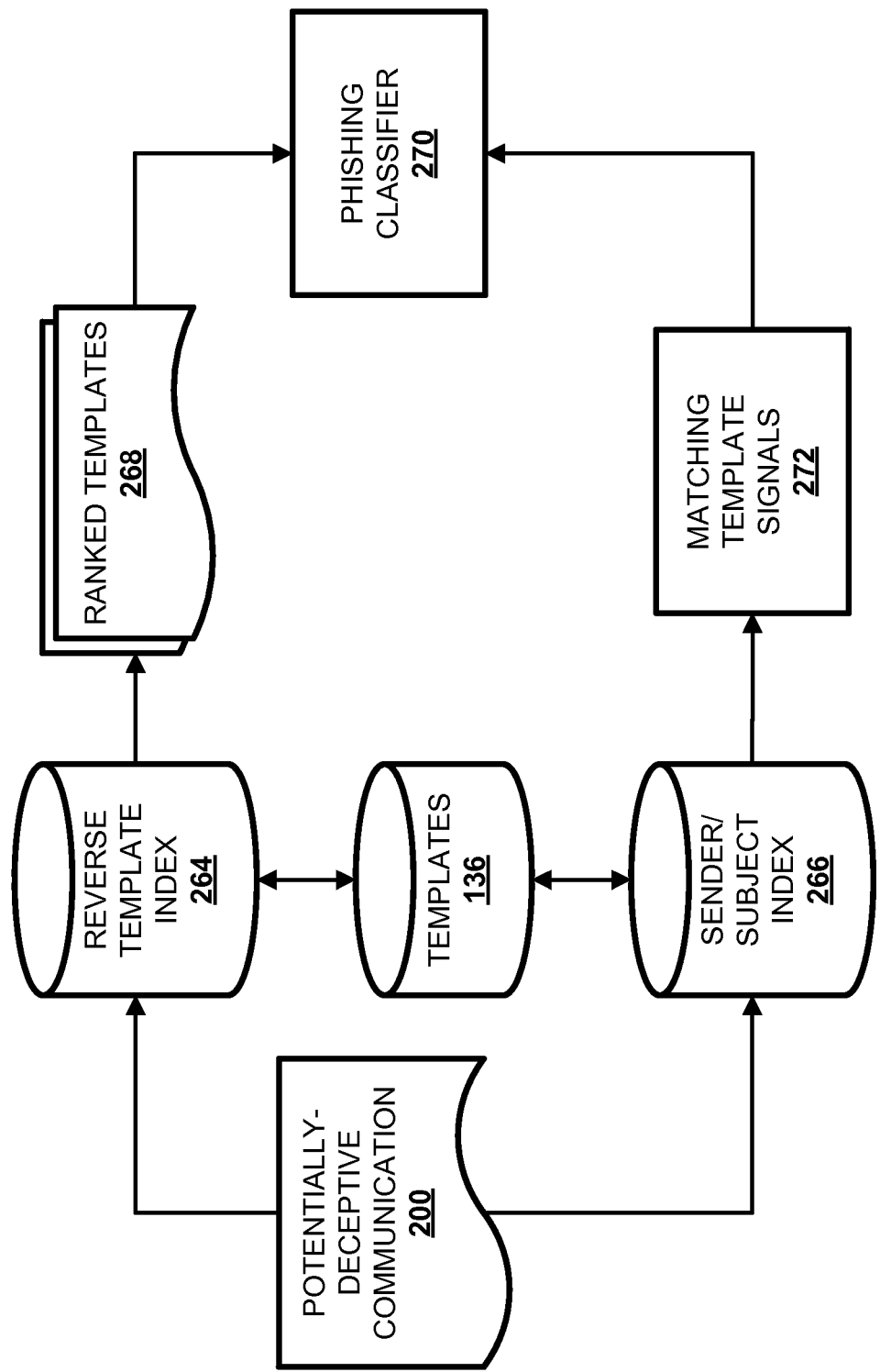
FIG. 2 illustrates an example environment in which a potentially-deceptive communication may be matched to one or more templates associated with one or more clusters of communications sent by one or more trustworthy entities, and in which a determination may be made as to whether the communication is a phishing attempt, in accordance with various implementations.

Referring now to FIG. 2, an example environment in which a potentially-deceptive communication 200 may be analyzed to determine whether it is a phishing attempt is depicted. As noted above, potentially-deceptive communication 200 may be an email, a text, an instant message, and so forth. In various implementations, template database 136 may store templates 154*a-n* generated by template generation engine 132. These templates may be "indexed" (e.g., sorted in an efficient manner), e.g., by indexing engine 134, on various template features as noted above. For example, a reverse template index 264 may index templates 154 by one or more characters, phrases (e.g., n-grams), overlapping phrases, and so forth. A sender/subject index 266 may index templates in template database 136 by patterns that match combinations of legitimate sender address and legitimate sender subjects, as mentioned above. For example, suppose a particular trustworthy entity sends legitimate emails from m different addresses (e.g., which may or may not all end with the same domain), and those emails have subjects that follow a particular pattern. A regular expression or similar pattern may be generated to match all legitimate sender addresses affiliated with the trustworthy entity, as well as match any legitimate subject line sent by that entity. This regular expression or similar pattern may be used as an alternative index to template database 136.

One or more characters, n-grams, and/or overlapping n-grams of potentially-deceptive communication 200 may be compared to indexed characters, n-grams, and/or overlapping n-grams in reverse template index 264 to quickly match potentially-deceptive communication 200 to one or more templates in template database 136. Potentially-deceptive communication 200 may be deemed to "match" a template when one or more measures of similarity between potentially-deceptive communication 200 and the template satisfy one or more criteria. In some implementations, a plurality of templates may be ranked, e.g., by one or more measures of similarity, and a predetermined number of the top ranked templates may be selected as "matches." In some implementations, templates having similarity measures to potentially-deceptive communication 200 that satisfy some predetermined threshold may also be selected as "matches." In some implementations, multiple "matched" templates may be ranked, e.g., as indicated at 268, and may be provided (e.g., themselves or as one or more indicative signals) to a phishing classifier 270.

Meanwhile, one or more addresses of potentially-deceptive communication 200, and in the case of FIG. 2, a subject of potentially-deceptive communication 200, may be matched to one or more templates in template database 136 using the indexed regular expressions in sender/subject index 266. Those matching templates may have one or more corresponding matched template signals 272. Matched template signals 272 may include, for instance, an identity of a trustworthy entity associated with the template, one or more legitimate addresses associated with that entity, one or more attributes of legitimate communications sent by that trustworthy entity, and so forth.

Phishing classifier 270 may be configured to determine, using a variety of signals, whether potentially-deceptive communication 200 is a legitimate communication or a phishing attempt. For example, in FIG. 2, phishing classifier 270 may determine whether potentially-deceptive communication 200 is legitimate or a phishing attempt based on the ranked matched templates 268 and the matching template signals 272. For example, if no templates are matched at sender/subject index 266 (and hence, no template signals 272 produced) after comparing one or more addresses associated with potentially-deceptive communication 200 to sender/subject index 266, phishing classifier 270 may classify potentially-deceptive communication 200 as a phishing attempt. By contrast, if there is a match between one or more addresses associated with potentially-deceptive communication 200 and one or more templates via sender/subject index 266, and particularly if the resulting matching template signals 272 correspond to one or more matched and ranked templates 268, phishing classifier 270 may classify potentially-deceptive communication 200 as legitimate.

Figure 3:
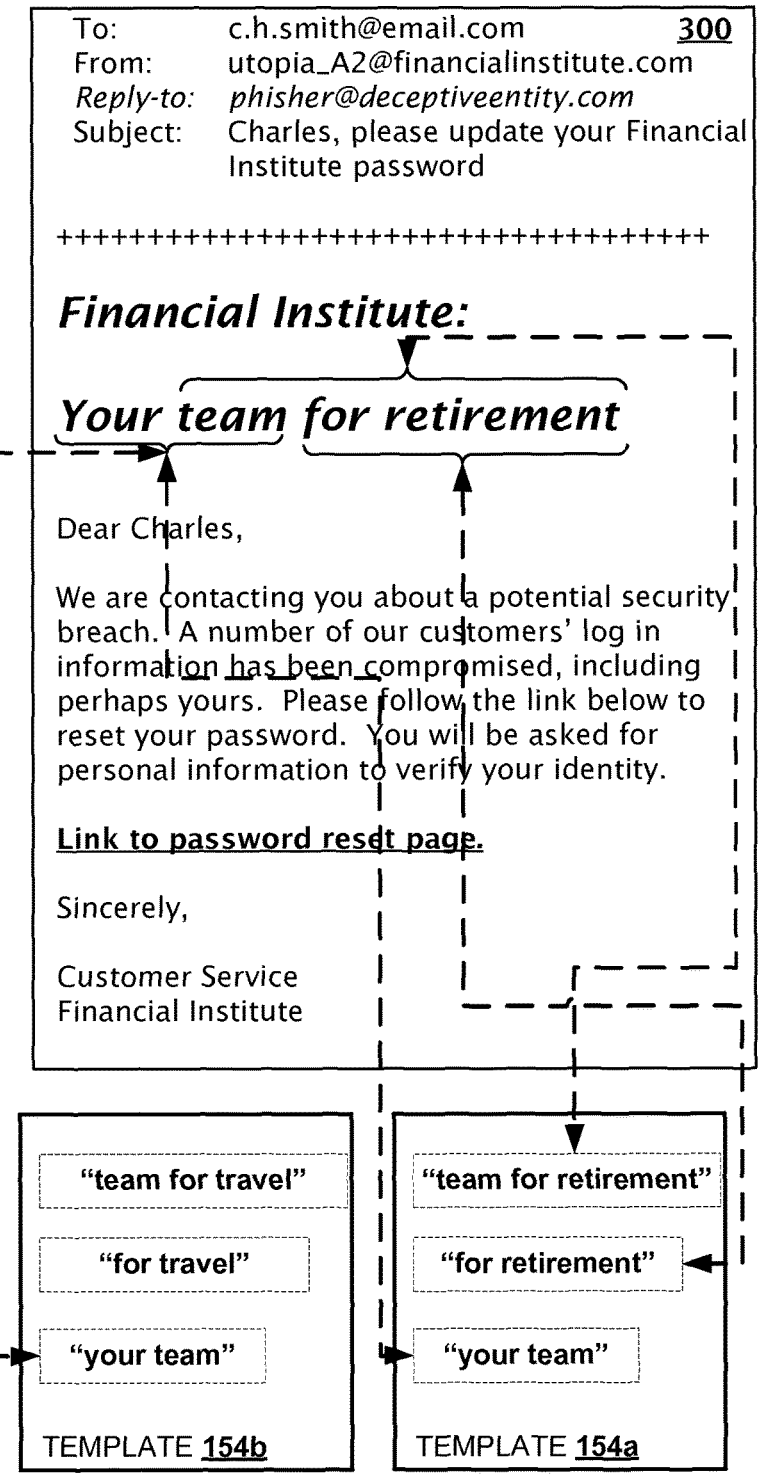
FIG. 3 depicts an example of how a potentially-deceptive communication may be matched to one or more indexed templates, in accordance with various implementations.

Referring now to FIG. 3, an example phishing communication 300 is depicted. Communication 300 is designed to mimic a legitimate communication from a trustworthy entity, "Financial Institute," and seeks to cause the recipient to click on a link to a purported "password reset page." However, the linked-to webpage (not depicted) may in fact be an illegitimate webpage that is designed to obtain sensitive information such as the recipient's log in information. The recipient may be lulled into providing this information by the legitimate appearance of the communication 300, as well as a legitimate appearance of the linked-to webpage.

In FIG. 3, a first example template 154a from template database 136 has been indexed in reverse template index 264 on at least three phrases: "for retirement"; "your team"; and an overlapping phrase, "team for retirement." A second example template 154b from template database 136 has been indexed in reverse template index 264 on at least three phrases: "for travel"; "your team"; and an overlapping phrase, "team for travel." Various phrases of communication 300 (referenced with brackets) have been matched to these indexed phrases as indicated by the arrows. It can be seen that phrases from communication 300 match three indexed phrases from the first template 154a, while phrases from communication 300 only match a single indexed phrase ("your team") from second template 154b.

In some implementations, a count (or cardinality) of matches between phrases in communication 300 and indexed phrases for template 154a may be considered as a measure of similarity between communication and template 154a. In some implementations, if the count satisfies one or more thresholds, template 154a may be considered a "match" for communication 300. For example, if a count threshold were set to three matches, first template 154a would qualify as a "match" for communication 300, whereas second template 154b would not. Additionally or alternatively, in some implementations, multiple templates may be ranked based on counts of matches between phrases in communication 300 and indexed phrases. In FIG. 3, for example, first template 154a would be ranked higher than second template 154b. In some implementations, a predetermined number of highest ranking templates may be selected as "matches" for communication 300.

In some implementations, various attributes of matched indexed phrases may be considered when determining a measure of similarity between a communication and templates, including but not limited to relative positions of phrases in the communication versus indexed phrases in templates. For example, suppose a communication contains a phrase in a salutation section of the communication that is matched by indexed phrases of two different templates. However, suppose the matched indexed phrase in the first template is in its respective salutation section, but the matched indexed phrase in the second template is in a different section. In some implementations, the first template may be assigned a higher measure of similarity than the second template. As noted above, a template with a higher measure of similarity may be ranked higher and/or may be more likely to satisfy some similarity measure threshold. In yet other implementations, measures of similarity between communication 300 and one or more templates 154 may be determined using other techniques, including but not limited to Levenshtein distance, cosine similarity, Kullback-Leibler, and so forth.

Once communication 300 is matched to first template 154a, various features of communication 300, such as one or more addresses, may be compared, e.g., by phishing classifier 270, to one or more features associated with trustworthy entities, to determine whether communication 300 is legitimate or a phishing attempt. For instance, the sender address of communication 300, "utopia_A2@financialinstitute.com", may very well match a pattern of legitimate addresses associated with the entity Financial Institute. However, the reply-to address, "phisher@deceptiveentity.com", clearly would not match any legitimate pattern of addresses. Additionally or alternatively, the URL linked to by the link "Link to password reset page" may also be checked against a pattern of legitimate URLS associated with the entity Financial Institute.

Figure 4:
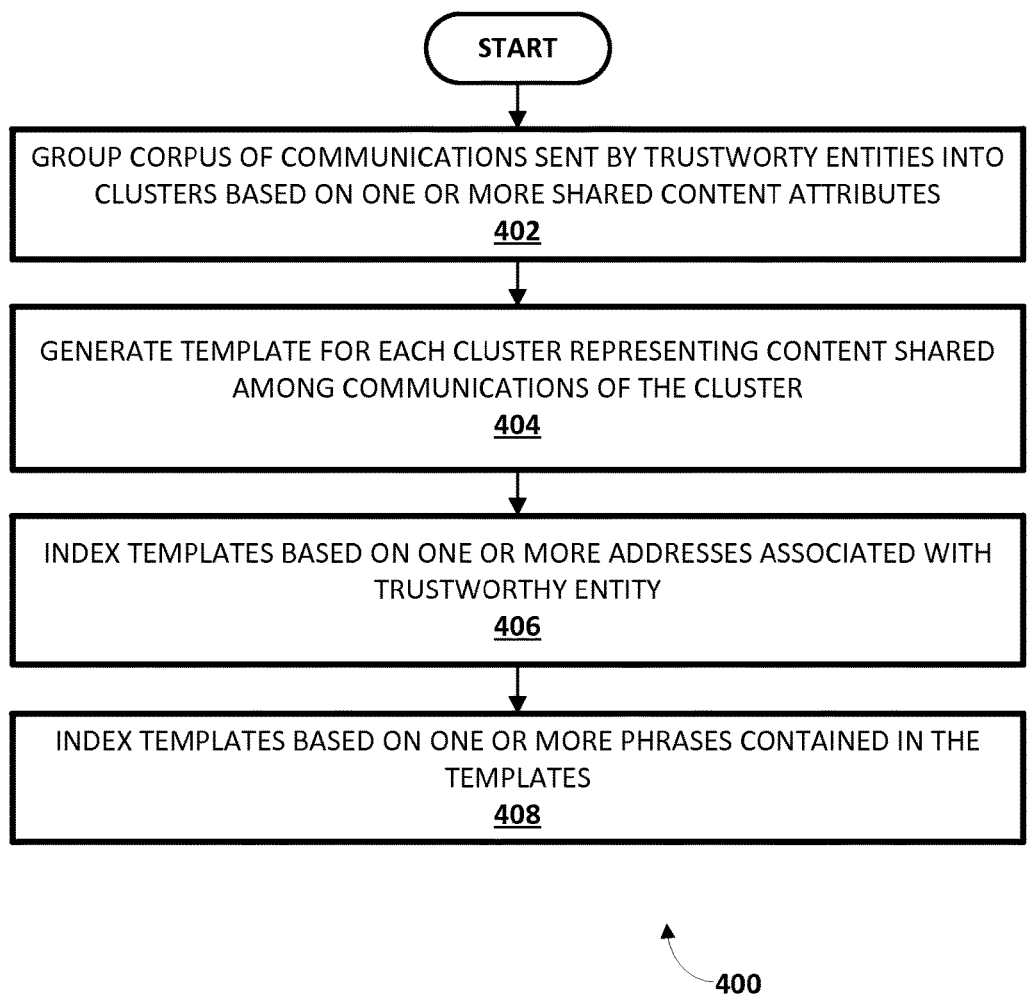
FIG. 4 depicts a flow chart illustrating an example method of generating templates for clusters of communications sent by trustworthy entities, and indexing those templates on various features, in accordance with various implementations.

Referring now to FIG. 4, an example method 400 of grouping communications into clusters of communications sent from trustworthy entities and generating/indexing corresponding templates is described. For convenience, the operations of the flow chart are described with reference to a system that performs the operations. This system may include various components of various computer systems, including various engines described herein. Moreover, while operations of method 400 are shown in a particular order, this is not meant to be limiting. One or more operations may be reordered, omitted or added.

At block 402, the system may group a corpus of communications into a plurality of clusters (which may or may not be disjoint) based on one or more shared content attributes. Example techniques for grouping documents into clusters are described above with respect to cluster engine 124. At block 404, the system may generate templates for each of the plurality of clusters formed at block 402. In various implementations, each generated template may represent content shared among communications of an associated cluster.

At block 406, the system may index the templates created at block 404 based on one or more addresses associated with trustworthy entities that sent the clusters of communications with which the templates are associated. As noted above, in some implementations, the templates may be indexed not only on one or more addresses, but on a combination of one or more addresses and a subject. For example, in some implementations, the templates may be indexed by key-value pairs <address, subject> (e.g., index 266). At block 408, the system may index the templates additionally on one or more phrases (or n-grams) contained in the templates. For example, a template may be indexed on one or more phrases contained in bodies of communications it represents, as well as one or more overlapping, or "shingled," phrases (e.g., index 264).

Figure 5:
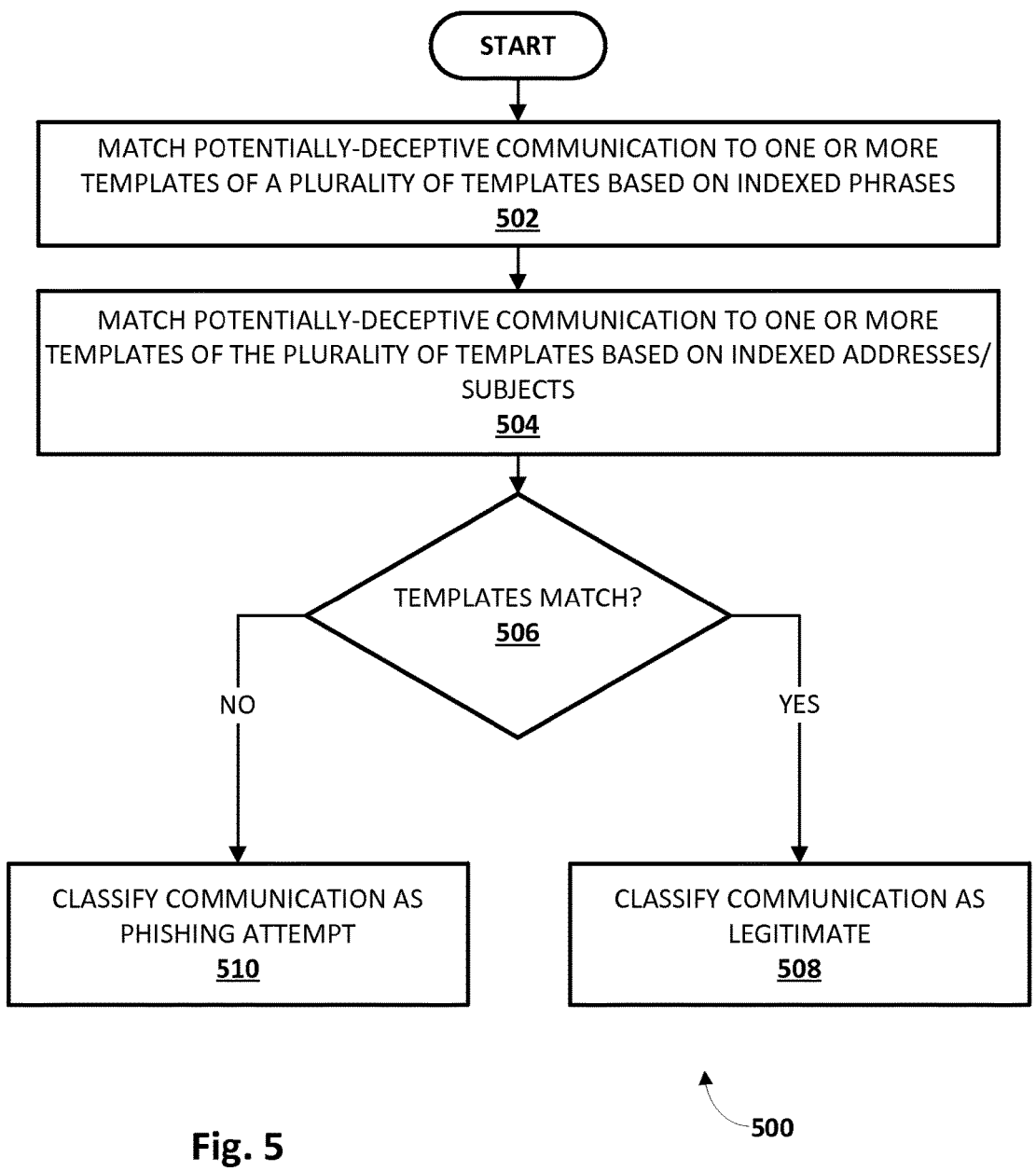
FIG. 5 depicts a flow chart illustrating an example method of determining whether communications are phishing attempts, in accordance with various implementations.

Referring now to FIG. 5, an example method 500 classifying potentially-deceptive communications as legitimate or as phishing attempts is described. As before, the operations of the flow chart are described with reference to a system that performs the operations. This system may include various components of various computer systems, including various engines described herein. Moreover, while operations of method 500 are shown in a particular order, this is not meant to be limiting. One or more operations may be reordered, omitted or added.

At block 502, the system may match a potentially-deceptive communication to one or more templates of a plurality of templates (e.g., generated at block 404 of FIG. 4) based on content shared by the communication and one or more templates. For example, content of a communication may be compared to indexed content of a plurality of templates to identify one or more matched templates. At block 504, the system may match the potentially-deceptive communication to one or more templates of the plurality of templates based on one or more addresses, a combination of one or more addresses with other components (e.g., a key-value pair of (sender, subject>), and so forth, as was described above with respect to FIGS. 2 and 3.

At block 506, groups of templates respectively matched at blocks 502 and 504 may be compared, e.g., by comparing one or more signals associated with those templates. If one or more templates from one group match one or more templates from the other, then the system may classify the communication as legitimate at block 508. However, if the templates do not match, e.g., especially where no templates are matched at block 504, then the system may classify the communication as a phishing attempt at block 510. Various actions may be taken on a communication classified as a phishing attempt. In some implementations where the communication has already arrived at the recipient's computing device, the communication may be discarded or routed into a "SPAM" or similar folder. In implementations where the communication has not yet arrived at the intended recipient's computing device (e.g., where disclosed techniques are implemented at an intermediate computing node between the source of the phishing attempt and the recipient), the phishing communication may be discarded, freeing up various intermediate network computing resources (e.g., bandwidth, processing power of intermediate nodes) for other purposes.

Figure 6:
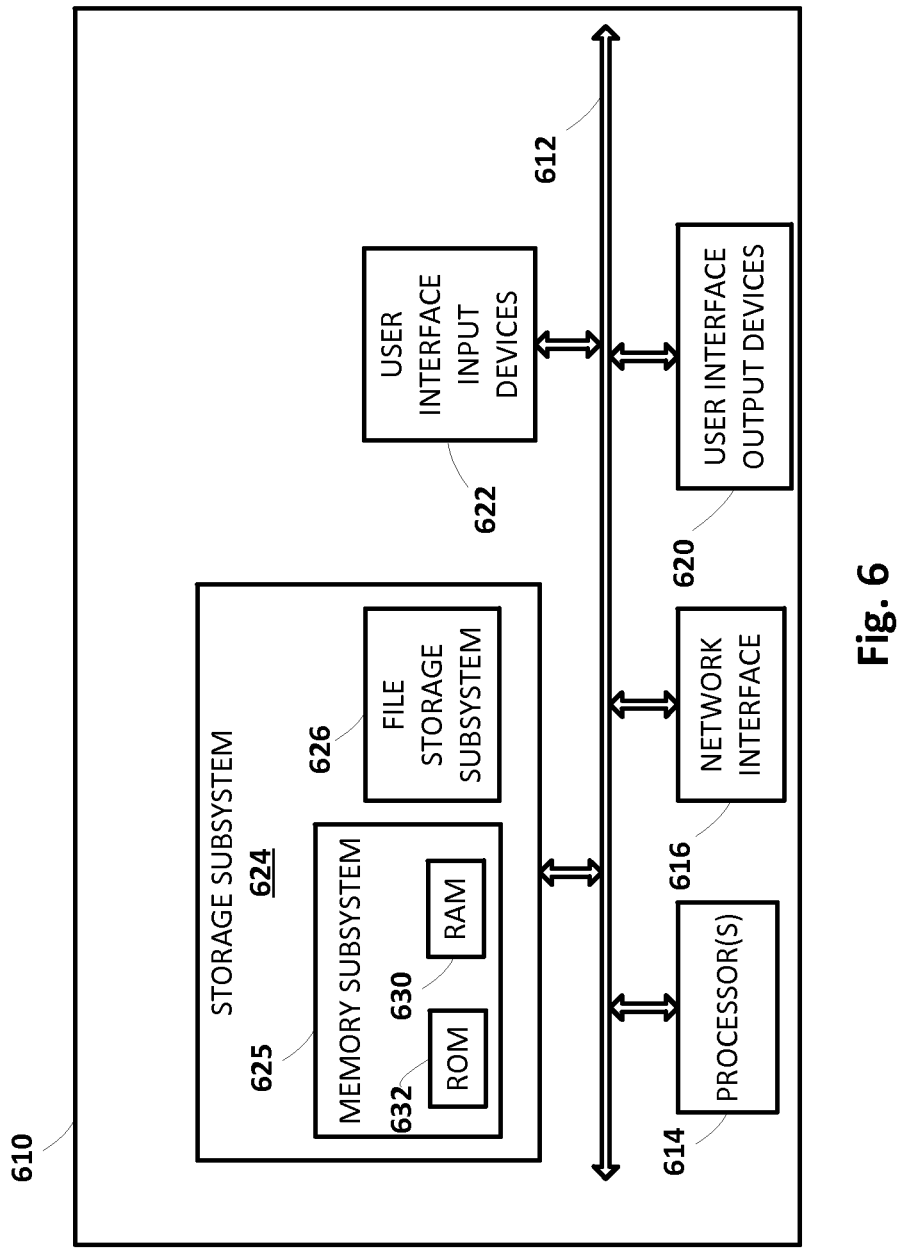
FIG. 6 schematically depicts an example architecture of a computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of methods 400 or 500, and/or to implement one or more of cluster engine 124, template generation engine 132, indexing engine 134, and/or phishing classifier 270.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
performing, by one or more processors, a first comparison between content of a communication to content of a plurality of templates, wherein each template represents content shared among a cluster of communications sent by a known legitimate entity;
identifying, by one or more of the processors based on the first comparison, one or more matching templates from the plurality of templates, wherein the one or more matching templates are associated with one or more known legitimate entities;
performing, by one or more of the processors, a second comparison of an address associated with the communication with one or more respective address patterns associated with the one or more known legitimate entities;
determining, by one or more of the processors based on the second comparison, that the address associated with the communication does not match the one or more respective address patterns;
classifying, by one or more of the processors based on the determining, the communication as a phishing attempt; and
discarding or re-routing, by one or more of the processors, the communication based on the classifying.

2. The computer-implemented method of claim 1, wherein the determining further comprises, for each of the one or more legitimate entities associated with the one or more matching templates, comparing:
a combination of the address associated with the communication and a subject of the communication; to
a combination of a pattern of addresses associated with the legitimate entity and a pattern found among subjects of communications sent by the legitimate entity.

3. The computer-implemented method of claim 1, wherein performing the first comparison comprises determining respective measures of similarity of the plurality of templates to the communication.

4. The computer-implemented method of claim 3, further comprising:
ranking the plurality of templates based on their respective measures of similarity; and
selecting, as the one or more matching templates, a predetermined number of highest ranking templates.

5. The computer-implemented method of claim 1, wherein the address is a linked-to network address contained in the communication.

6. The computer-implemented method of claim 1, wherein the address is a sender address.

7. The computer-implemented method of claim 1, wherein the address is a reply-to address.

8. The computer-implemented method of claim 1, wherein the first comparison comprises comparing one or more n-grams in the communication to one or more n-grams used to index the plurality of templates.

9. The computer-implemented method of claim 8, wherein the one or more n-grams used to index the plurality of templates are extracted from the content of the plurality of templates.

10. The computer-implemented method of claim 1, wherein the first comparison comprises comparing one or more overlapping n-grams in the communication to one or more overlapping n-grams used to index the plurality of templates.

11. A computer-implemented method, comprising:
matching, by one or more processors, a communication to a first subset of a plurality of templates using a forward index, wherein each template of the plurality of templates represents content shared among a cluster of communications sent by a known legitimate entity, and wherein the forward index is indexed on metadata associated with the plurality of templates;
matching, by one or more of the processors, the communication to a second subset of the plurality of templates using a reverse index, wherein the reverse index is indexed on content of the plurality of templates;
determining, by one or more of the processors, that there is no intersection between the first subset and the second subset;

classifying, by one or more of the processors based on the determining, the communication as a phishing attempt; and discarding or re-routing, by one or more of the processors, the communication based on the classifying.

12. The computer-implemented method of claim 11, wherein the metadata associated with each of the plurality of templates comprises a sender address associated with a respective legitimate entity.

13. The computer-implemented method of claim 11, wherein the metadata associated with each of the plurality of templates comprises a reply-to address associated with a respective legitimate entity.

14. The computer-implemented method of claim 11, wherein the metadata associated with each of the plurality of templates comprises a combination of a sender address and a subject associated with a respective legitimate entity.

15. The computer-implemented method of claim 11, wherein the metadata associated with each of the plurality of templates comprises a subject associated with a respective legitimate entity.

16. The computer-implemented method of claim 11, wherein the metadata associated with each of the plurality of templates comprises a pattern of sender addresses associated with a respective legitimate entity.

17. The computer-implemented method of claim 11, wherein the indexed content of the plurality of templates includes one or more n-grams associated with a respective legitimate entity.

18. A computer-implemented method, comprising:

grouping, by one or more processors, a corpus of communications sent by a plurality of known legitimate entities into a plurality of clusters based at least in part on metadata associated with the corpus of communications, wherein each cluster includes communications sent by a known legitimate entity;

generating, by one or more of the processors based on the plurality of clusters, a plurality of templates, wherein each template of the plurality of templates represents content shared among a cluster of the plurality of clusters that includes communications sent by a known legitimate entity;

creating, by one or more of the processors, a forward index that is indexed on metadata associated with the plurality of templates;

creating, by one or more of the processors, a reverse index, wherein the reverse index is indexed on content of the plurality of templates; and discarding or re-rerouting subsequent communications that match one or more templates in one of the forward or reverse indices, but not the other.

19. The computer-implemented method of claim 18, wherein the metadata associated with each of the plurality of templates comprises a combination of a sender address and a subject associated with a respective legitimate entity.

20. The computer-implemented method of claim 18, wherein the metadata associated with each of the plurality of templates comprises a subject associated with a respective legitimate entity.

* * * * *